July 16, 1963

H. ZELLER 3,097,870

SEALING RING

Filed Nov. 17, 1958

INVENTOR.
HANS ZELLER.

BY MICHAEL S. STRIKER
ATTORNEY 3,097,870
SEALING RING
Hans Zeller, Dresden, Germany, assignor, by mesne assignments, to The Weatherhead Company, Cleveland, Ohio
Filed Nov. 17, 1958, Ser. No. 774,217
1 Claim. (Cl. 285—341)

The present invention relates to pipe connections.

More particularly, the present invention relates to sealing rings of pipe connections.

In pipe connections which are intended to withstand extremely high pressures, there are certain types of sealing rings which are capable of cutting into the material of one of the pipes to form a fluid-tight connection capable of withstanding extremely high pressures. However, the conventional sealing rings of this type have several disadvantages. For example, it is essential with conventional sealing rings of this type to apply extremely strong radial pressures in order to be able to make the desired connection, and as a result such connections cannot be used with thin-walled tubes. When used with thin-walled tubes, the tubes themselves become undesirably deformed, and for this reason it is not possible to use this type of connection with pipes which have thin wells.

Another drawback of conventional type connections of the above type resides in the fact that the sealing rings do not uniformly cut into the material of the inner pipe. As a result, there is the possibility of localized areas where the desired fluid-tight action is not provided, and as a result leaks occur at such places.

One of the objects of the present invention is to overcome the above drawbacks by providing a sealing ring to be used in pipe connections and capable of being used with thin-walled pipes as well as thick-walled pipes.

Another object of the present invention it to provide a sealing ring of the above type which will reliably cut uniformly into the material of the inner pipe circumferentially around the axis thereof so that there cannot be any localized areas where the desired fluid-tight connection is not made.

An additional object of the present invention is to provide a sealing ring which is capable of providing a tight connection not only by cutting into one of the pipes but also by spreading the material of one of the pipes against a part of the sealing ring in a manner providing an absolutely fluid-tight connection.

It is also an object of the present invention to provide a sealing ring which is of a relatively simple construction while at the same time being inexpensive to manufacture and operating reliably to produce the desired results.

With the above objects in view the present invention includes in a pipe connection a sealing ring having inner and outer substantially cylindrical surfaces and provided adjacent one end of its inner cylindrical surface with an annular cutting edge of sawtooth configuration. When this sealing ring is assembled into the pipe connection, its cutting edge of sawtooth configuration is pressed uniformly into the material of the inner pipe so that the material of the latter fills completely the gaps between the teeth of the cutting edge, and in this way a fluid-tight connection is guaranteed around the entire circumference of the cutting edge.

The novel features which are considered as characteristic for the invention are set forth in particular in the appended claim. The invention itself, however, both as to its construction and its method of operation, together with additional objects and advantages thereof, will be best understood from the following description of specific embodiments when read in connection with the accompanying drawings, in which:

Figure 1:
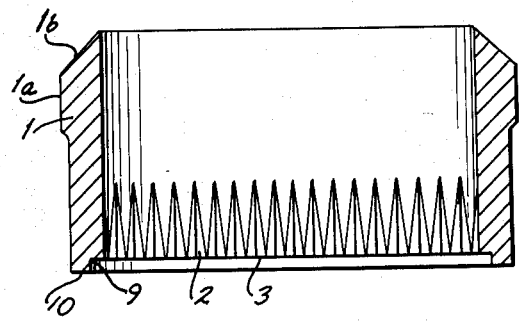
FIG. 1 is an elevational view of a sealing ring according to the present invention, the sealing ring being shown in section at the left part of FIG. 1.

Referring now to the drawings, it will be seen that the sealing ring 1 of the invention is of a substantially cylindrical configuration and this sealing ring may be made of any suitable metal. It will be noted that the sealing ring 1 has inner and outer substantially cylindrical surfaces. Adjacent the bottom end of its inner cylindrical surface, as viewed in FIG. 1, the sealing ring is formed with a plurality of axially extending cutouts 2 which extend upwardly from a cutting edge 3 located adjacent the bottom end of the sealing ring 1, as viewed in FIG. 1. This annular cutting edge 3 will cut into the material of one of the pipes, as described below. The cutouts 2 are each in the form of a groove extending axially along the sealing ring 1 and having a substantially V-shaped cross-section. As is apparent from FIG. 1 these grooves 2 are located one next to the other, and their widest and deepest ends are located at the cutting edge 3, so that the latter has a sawtooth configuraion. The grooves taper gradually from their ends located at the cutting edge 3, and they terminate at a substantial distance from the top end of the ring, as viewed in FIG. 1.

Also is accordance with the present invention, the sealing ring 1 is formed adjacent to its bottom end, as viewed in FIG. 1, with an inner annular cutout 9 giving the ring the stepped cross-sectional configuration illustrated at the left lower portion of FIG. 1, so that in the way the ring is formed with an internal shoulder one edge of which is formed by the sawtooth cutting edge 3, and this shoulder provides the ring 1 with a lip 10 extending forwardly from the cutting edge 3 and having a lesser thickness than the remainder of the ring 1. At its end distant from the lip 10, the ring 1 has an outwardly directed annular flange 1a and it has an outer annular surface 1b of frustoconical configuration as indicated in FIG. 1.

Figure 2:
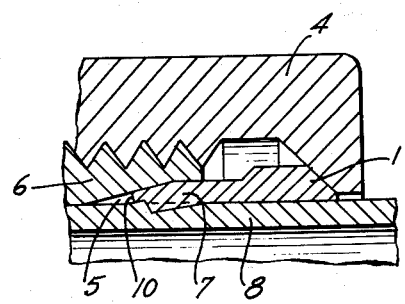
FIG. 2 is a fragmentary axial sectional elevational view showing how the sealing ring is assembled into a pipe connection.
Figure 3:
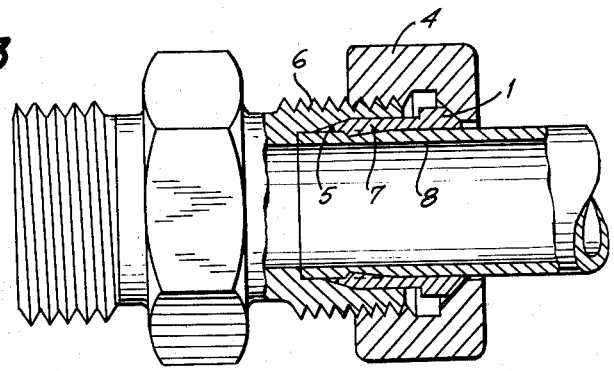
FIG. 3 shows the entire pipe connection.

As may be seen from FIGS. 2 and 3, when the sealing ring of the invention is assembled into a pipe connection, it is placed on the external cylindrical surface of an inner pipe 8 which extends into an outer pipe 6. This outer pipe 6 is provided at its right end, as viewed in FIGS. 2 and 3, with an inner surface 5 of frustoconical configuration which tapers in such a way that its largest end is located at the right extremity of the pipe 6, so that in this way the frustoconical surface 5 forms with the external cylindrical surface of the inner pipe 8 an annular space of wedge-shaped configuration.

A cap nut 4 is threadedly connected with the pipe 6 and has at its right end, as viewed in FIGS. 2 and 3, an inwardly directed annular flange having an inner surface of frustoconical configuration which engages the surface 1b of the sealing ring 1, so that as the cap nut 4 is drawn onto the pipe 6 tightly, the sealing ring 1 is urged to the left, as viewed in FIGS. 2 and 3, into the space between the surface 5 and the cylindrical surface of the inner pipe 8, and as a result the left end portion of the sealing ring 1, as viewed in FIGS. 2 and 3, is deflected and compressed into the material of the inner pipe 8, so that the teeth of the sawtooth cutting edge 3 dig into this material of the pipe 8, and the latter completely fills the gaps between the teeth of the sawtooth cutting edge. In other words, the grooves 2 are entirely filled by the material of the inner pipe 8, with the construction of the invention.

Furthermore, the material of the pipe 8 which is displaced therefrom during tightening of the nut 4, fills the annular cutout 9 just to the left of the cutting edge 3, as viewed in FIGS. 2 and 3, and this material forms an annular projection of the pipe 8 which is pressed tightly against the lip 10 around the entire circumference thereof, so that in this way also a fluid-tight connection is guaranteed.

The teeth of the cutting edge 3 of the sealing ring 1 cut uniformly into the material of the inner pipe even if some of these teeth should happen to come into contact with the material portions of the inner pipe 8 which are harder than other portions thereof, so that a uniform seal around the axis of the pipe is guaranteed. Tests have shown that the seal of the invention is capable of withstanding pressures of 120 atmospheres with absolute safety and reliability.

The sealing ring of the invention may be made of metals such as casehardened steel or hard metal, while the pipe 6 may be made of metals such as steel, copper, brass etc. or of plastics, and the pipe 8 can be made of metals such as steel, copper, brass etc. or of plastics.

It will be understood that each of the elements described above, or two or more together, may also find a useful application in other types of pipe connections differing from the types described above.

While the invention has been illustrated and described as embodied in sealing rings for pipe connections, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claim.

What is claimed as new and desired to be secured by Letters Patent is:

In a tube coupling including a body member having a flared mouth adapted to receive the end of a tube, a coupling member adapted to be drawn up toward the body, and a sleeve between said members and having a circumferentially continuous forward end portion which is deformable radially inwardly, said forward end portion having an outer camming surface adapted to enter said flared mouth and to be forced radially inwardly and simultaneously moved forwardly toward the body member when said coupling member is drawn up toward the body member, said sleeve having a smooth inner peripheral surface, the coupling having abutment means limiting forward movement of the tube, the improvement comprising a serrated surface at the forward end portion of the sleeve adjoining and lying radially outside said inner peripheral surface, said serrated surface comprising teeth having spaced crest portions connected by diverging flank portions, said flank portions forming grooves disappearing at a gradually decreasing radius and width away from said crest portions, the juncture of said crest portions and said flank portions with said inner peripheral surface forming a sharp cutting edge, whereby said edge cuts into the surface of the tube when said forward end portion is deformed inwardly to shear up the material of said tube into said grooves to form a seal between said sleeve and said tube when said groove is filled by the material of said tube for the full radial depth of the groove at a point forward of the rearward end of said grooves.

References Cited in the file of this patent

UNITED STATES PATENTS

| 1,888,343 | Bohlman | Nov. 22, 1932 |
| 2,017,154 | Larkin | Oct. 15, 1935 |
| 2,139,413 | Kreidel | Dec. 6, 1938 |
| 2,833,569 | Budnick | May 6, 1958 |

FOREIGN PATENTS

| 677,125 | Great Britain | Aug. 13, 1952 |

OTHER REFERENCES

R13,179, Germany, July 12, 1956.